Figure 1:
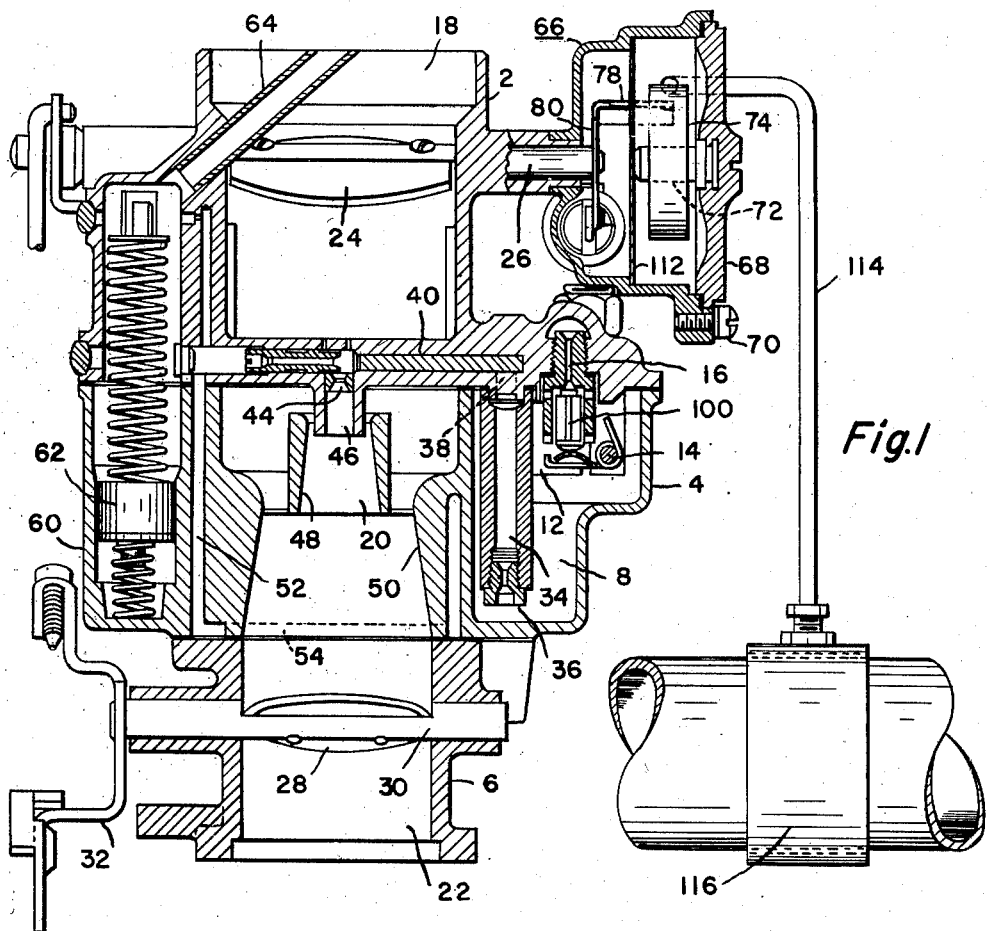

INVENTOR.
Arthur G. Winter
BY
Attorney ed States Patent Office 2,798,704
Patented July 9, 1957

2,798,704

CARBURETOR

Arthur G. Winter, Rochester, N. Y., assignor to General Motors Corporation, Detroit, Mich., a corporation of Delaware Application March 8, 1954, Serial No. 414,762

7 Claims. (Cl. 261—39)

This invention relates to carburetors for internal combustion engines, primarily those for automotive use, and more particularly, to automatic choke devices which are currently provided in substantially all automotive carburetors.

In conventional automatic choke devices at the present time an unbalanced choke valve is positioned in the air inlet of the carburetor which is held closed at temperatures lower than room temperature by the force exerted thereon by a thermostat and this force is, of course, progressively increased as the temperature decreases. When the engine is in operation, the force of the thermostat is opposed by the suction effect of the entering air directly on the unbalanced valve and also by the force exerted on the valve by a suction operated piston which is connected to the valve and to which the suction maintained at points posterior to the throttle is communicated.

Obviously, at any time after the engine is started and is in operation, the position of the choke valve is determined by these forces and the valve will assume a position where such forces are in balance, and the degree of opening of the valve is determined both by the force exerted by suction on the valve and by the temperature. For example, at low temperatures the valve will be held relatively near to closed position by the thermostat although the suction on the valve will be relatively great, but as the temperature increases, the same degree of suction will be effective to move the choke valve further and further toward open position and when the engine reaches normal operating temperature, the thermostat is without effect and the valve is wide open.

The mixture ratio of fuel to air is, of course, determined by the position of the choke valve after the engine starts to run and the requirements of all engines are not identical. For example, it may be desirable for any given engine temperature to have the choke valve more nearly closed and to provide a richer mixture for one engine than another. Therefore, to provide the proper mixture for the different engines, the same engine temperature must exert a different force on the choke valve through the thermostat.

It is accordingly the primary object of the present invention to provide means to control the application of heat to the choke controlling thermostat by the position of the choke valve itself, whereby the position of the choke valve for any engine temperature can be controlled.

The thermostat of conventional automatic choke devices is heated by conveying hot air from a housing around the exhaust pipe through a conduit to a housing around the choke controlling thermostat and through such housing, the flow of such hot air being effected by the suction which is effective on the piston connected to the choke valve to move the latter in response to variations in suction. According to the present invention, this piston is utilized to control the application of heat to the thermostat by controlling the degree of suction effective to cause a flow of heated air through the thermostat housing as the valve and the piston are moved to different positions.

Also, the degree of suction which is effective to move the piston is modified by the position of the piston itself, so that the position of the choke valve is controlled by varying application of heat to the thermostat and by variation in the effect of motion on the piston as the latter and the choke valve move to different positions.

The present invention is illustrated as embodied in a carburetor such as disclosed in pending application S. N. 192,035 of Elmer Olson, now Pat. No. 2,698,168, dated Dec. 28, 1954, but the particular construction of the carburetor is not material so far as the present invention is concerned as such invention is applicable to any carburetor having an automatic choke. Therefore, the carburetor construction will not be described in detail but only very briefly.

The carburetor is formed of three separate castings, an air inlet casting 2, a fuel chamber casting 4 and an outlet or throttle body casting 6 which has a flange for attachment to the engine intake manifold in the conventional manner. In the casting 4 there is a fuel chamber 8 in which fuel is maintained at a constant level by the valve 10 operated by the float 12 pivotally mounted by the pin 14. This valve controls admission of fuel through a passage to which fuel is supplied by the usual fuel pump and stops the flow of fuel when a predetermined level is reached in the chamber 8 in the customary manner.

The mixture or intake passage extends through the three castings and includes an air inlet 18, a mixing chamber 20 and a mixture outlet 22. Admission of air to the inlet 18 is controlled by a choke valve 24 secured to the shaft 26 and rotatably journalled in the casting 2. Movements of the choke valve are controlled automatically by mechanism which will be fully described later.

In the mixing chamber 20 fuel from the chamber 8 is mixed with the air entering at 18 to form a combustible mixture which flows through the outlet 22 to the engine and the quantity of mixture supplied is controlled by a throttle valve 28 secured to shaft 30 rotatably mounted in casting 6 and manually operated by an arm 32 secured to the shaft. Fuel flows to the mixing chamber through a tube 34 secured to the casting 2 and extending downwardly into the chamber 8. A calibrated plug 36 screwed into the bottom of tube 34 meters the fuel supplied to the mixing chamber. At its upper end, tube 34 connects with a passage 38 in casting 2 which, in turn, connects with a horizontal passage 40 divided into two parts by a vertical partition. Fuel flows on both sides of the partition, then through the restricted opening 44 and main fuel jet 46 which discharges into a small venturi tube 48, terminating at the throat of a larger venturi tube 50.

The passage 40 extends entirely across the intake passage to supply fuel for idling, connecting at the left end with a passage 52 which, at its lower end connects with a passage with which an idling fuel jet (not shown) communicates.

At the left of Fig. 1 is a cylinder 60 in which a piston 62 operates by the throttle slides. This piston and cylinder constitute an accelerator pump for supplying additional fuel when the throttle is opened to provide a mixture which is rich enough for satisfactory acceleration. The top of cylinder 60 communicates with the space above the fuel in the chamber 8 and such space is vented by means of the tube 64 which terminates in the air inlet 18 anterior to the choke valve 24.

All of the mechanism so far described is of the same construction as shown in the copending application previously referred to and will not be described in greater detail herein.

Figure 3:
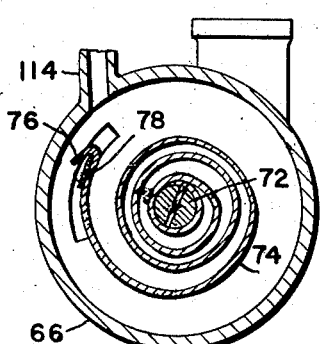

As previously indicated, the movements of the choke valve 24 are controlled by variations in temperature and engine suction. To this end the valve itself is unbalanced, that is, the shaft 26 is positioned off-center so that the suction effect of the entering air directly on the valve itself tends to open the valve and the valve is also controlled by a thermostat and by the suction posterior to the throttle 24. The right end of the shaft extends into a housing 66 which is secured in any desirable way to the casting 2. The right end of this housing is closed by a plate, which is preferably of Bakelite or some other suitable plastic, but may be metal, if desired, and such plate is held in any desired position of adjustment by screws 70. Fixed in the plate 68 is a stud 72 and supported by such stud is a thermostat 74 one end of which is received in a slot in the stud where it is fixed in any suitable way. The other end of the thermostat has a hook 76 which engages the end of an arm 78, as best shown in Fig. 3. The arm 78 is integral with and normal to an arm 80, the middle portion of which is secured by riveting or otherwise to the right end of shaft 24. Upon reduction of temperature, the hooked end 76 of the thermostat moves the arm 78 in a direction to close the choke valve on reduction of temperature and upon increase of temperature, the hooked end of the thermostat merely moves away from the arm 78. The latter, due to the effect of suction, will follow the thermostat and will stop in whatever position the force of the thermostat is balanced by the force of suction. Where normal engine operating temperature is reached, the thermostat is without effect and the choke valve will assume whatever position is determined by the suction, but the valve is never moved toward open position by the thermostat. The connection between the valve and the thermostat is a one-way connection and the thermostat can actually move the valve only in the closing direction.

Figure 2:
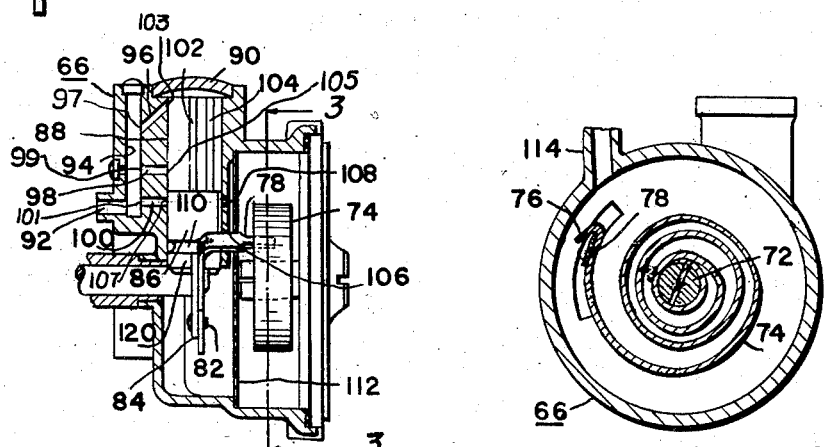

The lower end of the arm 80 is pivotally connected by the pin 82 to a link 84 which is pivotally connected in a slot formed in the end of a piston 86 slidable in a cylinder 88 formed in the thermostat housing 66, as best shown in Fig. 2, and closed at its left end by the plug or cap 90. Movement of the piston upwardly, as shown in Fig. 2 effects opening of the choke valve and such movement is effected by suction communicated to the cylinder above said piston from a point posterior to the throttle 28. A suction passage 92 is adapted to be connected to a conduit which is not shown, but may be connected either with the outlet of the carburetor posterior to the throttle 28 or with the intake passage in the intake manifold itself. The passage 92 connects with a passage 94 parallel to the cylinder 88 and connected therewith by three passages 96, 98 and 100. Passages 96, 98 and 100 respectively include ports 97, 99 and 101 registering with the vacuum passage 94, as well as ports 103, 105 and 107 in registry with cylinder 88. The passage 96 is never closed by movement of the piston but the passages 98 and 100 are either blocked by the piston or are open, depending upon the position of the piston, as will be specifically described later.

In the wall of the cylinder are a plurality of longitudinal grooves, two of which, 102 and 104, are shown in Fig. 2. The specific number of these grooves is not important, but the length of such grooves is such that they are uncovered by the piston as it is moved in response to suction before the piston reaches the passage 96 and after the grooves are uncovered, the movement of the piston in response to suction ceases, because when this takes place there is substantially no pressure differential across the piston which would cause further movement thereof. Also in this position of the piston, the choke valve is substantially fully open.

The suction which is effective within the cylinder 88 is communicated to the interior of the housing 66 through a slot 106 formed in the wall of the piston 86 and parallel to the axis of the piston. This slot registers with an opening 108 in the wall of the cylinder 88 which communicates with the interior of the housing 66 and also extends to a groove 110 formed in the peripheral surface of the piston for a purpose which is more fully set forth hereinafter. The suction which is communicated to the housing through opening 108 is also communicated to the space in which the thermostat 74 is positioned, through a screen 112 and is, therefore, effective to draw heat into such space through a conduit 114 which is connected with the housing in any suitable way and extends to a housing 116 which surrounds the exhaust pipe in a manner well known, and to which the conduit may be connected in any suitable way. The amount of suction which is maintained in the housing 66 is determined not only by the amount of suction communicated to the cylinder 88, but also by the area of the passageways through which suction is communicated to the housing 66. The position of the valve 24 is, of course, dependent on the suction in cylinder 88 and also the suction in housing 66 which controls the heat applicable to the thermostat 74 and the force exerted by the thermostat in opposition to the force exerted by the piston and the effect of suction directly on the unbalanced valve itself.

With the arrangement disclosed herein, when the engine is inoperative the parts are in the position shown in Fig. 2 with passages 96 and 98 effective to communicate suction to the cylinder 88, while the passage 100 is completely blocked by the wall of the piston 86. Suction is also communicated to the housing 66 through the groove 106 which connects with cylinder 88 and orifice 108. As soon as the engine starts to run, the suction in the cylinder 88 is much increased and the piston is moved upwardly, as seen in Fig. 2, to some extent. As soon as it moves enough to start covering up the passage 98, the suction in the cylinder and the housing 66 is progressively reduced until passage 98 is fully covered after which the suction will be substantially constant until the groove 110 begins to uncover passage 100.

When this takes place, the suction which is communicated to housing 66 begins to increase and continues to increase until the groove is fully in register with the passage 100. If the piston moves further upward, as seen in Fig. 2, which would occur if the temperature continues to increase or if the suction increases, the groove would start to move out of registry with the passage 100 and ultimately it would be entirely out of register with such passage and the passage would be blocked by the head 120 of the piston. During this movement, the suction in housing 66 would be rapidly decreased and finally reach a point where there is almost no suction in such housing because when the head of the piston blocks the passage 100, it substantially blocks the passage 108 as well. This condition would continue to prevail as long as the piston head blocks the passages 100 and 108.

Finally, as the choke valve approaches its fully open position, the piston head moves far enough upward, as see in Fig. 2, to uncover the passages 100 and 108. As it begins to uncover these passages the suction in housing 66 is rapidly increased until it reaches a maximum when both passages are fully uncovered, and remains at such maximum as long as the piston is in a position where such passages remain fully open.

It will be apparent from the foregoing that by means of the apparatus disclosed, the suction in housing 66 can be variably controlled, increased or decreased in accordance with the position of the choke valve to vary the heating effect produced at the thermostat and in this way the rate at which the choke valve moves, in response to variation in engine suction and engine temperature, can be controlled in different parts of its range of movement so that it will move faster or slower during some part of its range of movement, as desired. By suitably positioning the several passages, the groove 110 and the end of the piston head 120 and providing the passages of proper size, substantially any desired rate of movement of the choke valve at different points in its range of movement, can be obtained.

As shown, the parts are so positioned that the suction in chamber 66 decreases when the choke valve is about 10 degrees open, then increases when it is about 25 degrees open, then decreases rapidly again when it is about 35 degrees open, remains substantially stationary until the choke is about 50 degrees open, when the suction increases again and continues at an increased level until the choke gets to fully-open position.

It will be understood, however, that these values are purely illustrative and by changing the position of the passages and the areas thereof, the function of the device can be much modified and the points in the range of movement of the choke valve at which the increases and decreases of suction in housing 66 occur can be changed to meet different conditions which may be encountered with different engines.

While the embodiment of the present invention as herein disclosed constitutes a preferred form, it is to be understood that other forms might be adopted.

What is claimed is as follows:

1. In a carburetor for an internal combustion engine having a mixture passage, means for supplying fuel and air to said passage to form a combustible mixture of fuel and air therein, a throttle for controlling the quantity of combustible mixture supplied to the engine, a choke valve for controlling admission of air to said mixture passage, means for automatically controlling the position of the choke valve including a thermostat urging the choke valve toward closed position at low temperatures a housing for said thermostat, a suction operated piston operatively connected to said valve and movable therewith to effect opening of the valve upon increase in suction effective on said piston, a cylinder in which said piston is slidable, and having a passage in the wall thereof connecting with the thermostat housing, a conduit for conveying heated air to said housing, a suction conduit for communicating the engine suction to said cylinder, a plurality of ports in the wall of said cylinder, one of which is constantly open, said ports connecting with said suction conduit and being progressively blocked by the suction operated piston as the choke valve is moved from closed to open position so as to reduce the suction communicated to said cylinder and through the passage in the wall thereof to the thermostat housing in accordance with the position of said piston, whereby reduction in the force exerted by the thermostat to hold the choke is retarded.

2. In a carburetor for an internal combustion engine having a mixture passage, means for supplying fuel and air to said passage to form a combustible mixture of fuel and air therein, a throttle for controlling the quantity of combustible mixture supplied to the engine, a choke valve for controlling admission of air to said mixture passage, means for automatically controlling the position of the choke valve including a thermostat operable to hold the valve closed at low temperatures a housing for said thermostat, a suction operated piston operatively connected to said choke valve and movable therewith to effect opening of the choke valve upon increase in the suction effective on said piston, a cylinder in which the piston is slidable and having a passage in the wall thereof, connecting with the thermostat housing, a conduit for conveying heated air to said housing, a suction conduit for communicating the engine suction to said cylinder, a plurality of axially spaced ports in the side wall of said cylinder all of which connect with said suction conduit, including a constantly open port and a plurality of other ports progressively opened and closed by movement of said piston, so that the suction communicated to the thermostat housing is variably controlled in accordance with the position of the piston.

3. In a carburetor for an internal combustion engine having a mixture passage, means for supplying fuel and air to said passage to form a combustible mixture of fuel and air therein, a throttle for controlling the quantity of combustible mixture supplied to the engine, a choke valve for controlling admission of air to said mixture passage, means for automatically controlling the position of the choke valve including a thermostat, a housing for said thermostat, a suction operated piston operatively connected with said choke valve and movable therewith to effect opening of the choke valve upon increase in the suction effective on said piston, a cylinder in which said piston is slidable and having a port in the wall thereof for connecting the thermostat housing with said cylinder, a groove in the wall of the piston in registry with said port to communicate the suction maintained in the cylinder to the housing, a conduit for conveying heated air to the housing, a suction conduit for communicating the engine suction to said cylinder, a plurality of axially spaced ports, including one constantly open port in the side wall of said cylinder connecting with said suction conduit, the effectiveness of such ports other than the constantly open port being controlled by the piston to variably control the suction effective to draw heated air through the thermostat housing.

4. In a carburetor for an internal combustion engine having a mixture passage, means for supplying fuel and air to said passage to form a combustible mixture of fuel and air therein, a throttle for controlling the quantity of combustible mixture supplied to the engine, a choke valve for controlling admission of air to said mixture passage, means for automatically controlling the position of the choke valve including a thermostat and a suction operated piston operatively connected to said valve and movable therewith, a cylinder in which said piston is slidable, a housing surrounding the thermostat and communicating with said cylinder, a conduit for conveying heated air to said housing, a suction conduit for communicating the engine suction to said cylinder, a port in the wall of the cylinder communicating the suction maintained in the cylinder to the thermostat housing, a groove extending axially of said piston and communicating with said port to communicate the suction in said cylinder to the port, a plurality of axially spaced ports in the wall of the cylinder connecting the suction conduit with the cylinder and including one constantly open port and a plurality of additional ports, the effectiveness of which is controlled by the piston during movement of the choke valve, so as to selectively determine the amount of suction communicated to the thermostat housing in accordance with the position of the choke valve.

5. In a carburetor for an internal combustion engine having a mixture passage, means for supplying fuel and air to said passage to form a combustible mixture of fuel and air therein, a throttle for controlling the quantity of combustible mixture supplied to the engine, a choke valve for controlling admission of air to said mixture passage, means for automatically controlling the position of the choke valve including a thermostat and a suction operated piston operatively connected to said valve and movable therewith, a cylinder in which said piston is slidable, a housing surrounding the thermostat and communicating with said cylinder, a conduit for conveying heated air to said housing, a suction conduit for communicating the engine suction to said cylinder, a port in the wall of the cylinder communicating the suction maintained in the cylinder to the thermostat housing, a groove extending axially of said piston and communicating with said port to communicate the suction in said cylinder to the port, a plurality of axially spaced ports in the wall of the cylinder connecting the suction conduit with the cylinder and including one constantly open port, the effectiveness of certain of said ports being controlled by the piston during movement of the choke valve, so as to selectively determine the amount of suction communicated to the thermostat housing in accordance with the position of the choke valve and a peripheral groove in the wall of the piston movable into registry with one of said axially spaced ports and with the port which communicates with the thermostat housing when the choke valve is opened to a predetermined extent.

6. In a carburetor for an internal combustion engine having a mixture passage, means for supplying fuel and air to said passage to form a combustible mixture of fuel and air therein, a throttle for controlling the quantity of combustible mixture supplied to the engine, a choke valve for controlling admission of air to said mixture passage, means for automatically controlling the position of the choke valve including a thermostat and a suction operated piston operatively connected to said valve and movable therewith, a cylinder in which said piston is slidable, a housing surrounding the thermostat and communicating with said cylinder, a conduit for conveying heated air to said housing, a suction conduit for communicating the engine suction to said cylinder, a port in the wall of the cylinder communicating the suction maintained in the cylinder to the thermostat housing, a groove extending axially of said piston and communicating with said port to communicate the suction in said cylinder to the port, a plurality of axially spaced ports in the wall of the cylinder connecting the suction conduit with the cylinder and including one constantly open port, the effectiveness of certain of said ports being controlled by the piston during movement of the choke valve, so as to selectively determine the amount of suction communicated to the thermostat housing in accordance with the position of the choke valve and a peripheral groove in the wall of the piston movable into registry with one of said axially spaced ports and with the port which communicates with the thermostat housing when the choke valve is opened to a predetermined extent, said axially extending groove in the wall of the piston being effective to communicate the suction of said cylinder to the peripheral groove in said piston wall.

7. In a carburetor for an internal combustion engine having a mixture passage, means for supplying fuel and air to said passage to form a combustible mixture of fuel and air therein, a throttle for controlling the quantity of combustible mixture supplied to the engine, a choke valve for controlling admission of air to said mixture passage, means for automatically controlling the position of the choke valve including a thermostat and a suction operated piston operatively connected to said valve and movable therewith, a cylinder in which said piston is slidable, a housing surrounding the thermostat and communicating with said cylinder, a conduit for conveying heated air to said housing, a suction conduit for communicating the engine suction to said cylinder, a port in the wall of the cylinder communicating the suction maintained in the cylinder to the thermostat housing, a groove extending axially of said piston and communicating with said port to communicate the suction in said cylinder to the port, a plurality of axially spaced ports in the wall of the cylinder connecting the suction conduit with the cylinder, and including one constantly open port, the effectiveness of certain of said ports being controlled by the piston during movement of the choke valve, so as to selectively determine the amount of suction communicated to the thermostat housing in accordance with the position of the choke valve and at least one groove in the wall of the cylinder which is rendered effective to admit heated air to said cylinder to substantially nullify the suction therein when the choke valve approaches fully open position.

References Cited in the file of this patent
UNITED STATES PATENTS

| | | |
|---|---|---|
| 2,127,735 | Hunt | Aug. 23, 1938 |
| 2,325,372 | Coffey | July 27, 1943 |
| 2,523,798 | Winkler | Sept. 26, 1950 |
| 2,538,570 | Kittler | Jan. 16, 1951 |
| 2,667,154 | Ball | Jan. 26, 1954 |
| 2,719,706 | Winkler | Oct. 4, 1955 |